US010785001B2

(12) United States Patent
Cheng et al.

(10) Patent No.: US 10,785,001 B2
(45) Date of Patent: Sep. 22, 2020

(54) SYSTEMS AND METHODS FOR UE-SPECIFIC BEAM MANAGEMENT FOR HIGH FREQUENCY WIRELESS COMMUNICATION

(71) Applicant: Futurewei Technologies, Inc., Plano, TX (US)

(72) Inventors: Qian Cheng, Aurora, IL (US); George Calcev, Hoffman Estates, IL (US); Majid Ghanbarinejad, Rolling Meadows, IL (US); Jialing Liu, Palatine, IL (US); Diana Maamari, Palatine, IL (US); Lukasz Krzymien, Rolling Meadows, IL (US); Weimin Xiao, Hoffman Estates, IL (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/671,948

(22) Filed: Aug. 8, 2017

(65) Prior Publication Data
US 2018/0041319 A1 Feb. 8, 2018

Related U.S. Application Data

(63) Continuation of application No. PCT/CN2017/096504, filed on Aug. 8, 2017.
(Continued)

(51) Int. Cl.
*H04L 5/00* (2006.01)
*H04B 7/0408* (2017.01)

(52) U.S. Cl.
CPC ......... *H04L 5/0048* (2013.01); *H04B 7/0408* (2013.01); *H04L 5/0044* (2013.01)

(58) Field of Classification Search
CPC ....... H04B 7/04; H04B 7/0408; H04L 5/0044; H04L 5/0048; H04W 16/28
See application file for complete search history.

(56) References Cited

U.S. PATENT DOCUMENTS

| 7,957,759 B2 * | 6/2011 | Papasakellariou .... H04W 52/36 455/522 |
| 8,369,884 B2 * | 2/2013 | Ishii ...................... H04L 5/0075 370/318 |

(Continued)

FOREIGN PATENT DOCUMENTS

| CN | 103959877 A | 7/2014 |
| EP | 3048853 A1 | 7/2016 |

(Continued)

OTHER PUBLICATIONS

3GPP TS 36.211 V13.1.0 "3rd Generation Partnership Project; Technical Specification Group Radio Access Network; Evolved Universal Terrestrial Radio Access (E-UTRA); Physical Channels and Modulation (Release 13)," Mar. 2016, 155 pages.
(Continued)

*Primary Examiner* — Eric Nowlin
(74) *Attorney, Agent, or Firm* — Slater Matsil, LLP

(57) ABSTRACT

A physical downlink shared channel (PDSCH) region of a subframe may include a reference signal (RS) section that includes one or more of a beam-scanning subsection, a transmit (TX) beam-tracking subsection, a receive (RX) beam-tracking subsection, and a channel state information (CSI) subsection. Reference signals in the TX beam-tracking subsection may be used to update TX analog beams. Reference signals in the RX beam-tracking subsection may be used to update RX analog beams. Reference signals in the beam-scanning subsection may be used to evaluate different combinations of TX and RX analog beams for use in a future directional data transmission. Reference signals in the CSI
(Continued)

subsection may be transmitted over quasi-co-located (QCL) antenna ports, and may be used for purposes of channel estimation.

37 Claims, 12 Drawing Sheets

Related U.S. Application Data

(60) Provisional application No. 62/372,200, filed on Aug. 8, 2016.

(56) References Cited

U.S. PATENT DOCUMENTS

| | | | | |
|---|---|---|---|---|
| 8,594,675 B2 * | 11/2013 | Kwon | ............... | H04W 36/30 |
| | | | | 370/328 |
| 9,014,636 B2 * | 4/2015 | Kalyani | ............. | H04W 72/085 |
| | | | | 455/63.1 |
| 9,661,643 B2 * | 5/2017 | Kalyani | ............. | H04W 72/085 |
| 9,768,930 B2 * | 9/2017 | Park | ............... | H04L 5/0014 |
| 9,814,068 B2 * | 11/2017 | Frenne | ............... | H04B 7/086 |
| 9,838,980 B2 * | 12/2017 | Papasakellariou | .... | H04W 52/36 |
| 10,091,662 B1 * | 10/2018 | Bendlin | ............... | H04W 16/18 |
| 2008/0139237 A1 * | 6/2008 | Papasakellariou | .... | H04L 5/0048 |
| | | | | 455/522 |
| 2010/0041430 A1 * | 2/2010 | Ishii | ............... | H04W 52/04 |
| | | | | 455/522 |
| 2011/0212745 A1 * | 9/2011 | Papasakellariou | .... | H04L 27/261 |
| | | | | 455/522 |
| 2012/0015659 A1 * | 1/2012 | Kalyani | ............... | H04W 24/08 |
| | | | | 455/436 |
| 2012/0322492 A1 | 12/2012 | Koo et al. | | |
| 2013/0114419 A1 | 5/2013 | Chen et al. | | |
| 2013/0121267 A1 | 5/2013 | Koorapaty et al. | | |
| 2014/0086221 A1 * | 3/2014 | Davydov | ............... | H04W 4/70 |
| | | | | 370/336 |
| 2015/0195843 A1 * | 7/2015 | Kalyani | ............... | H04L 5/0062 |
| | | | | 370/252 |
| 2016/0134352 A1 | 5/2016 | Stirling-Gallacher | | |
| 2016/0190707 A1 | 6/2016 | Park et al. | | |
| 2016/0227548 A1 * | 8/2016 | Nimbalker | ......... | H04W 72/042 |
| 2016/0285660 A1 * | 9/2016 | Frenne | ............... | H04L 27/261 |
| 2017/0164377 A1 * | 6/2017 | Ho | ............... | H04W 16/28 |
| 2017/0250781 A1 * | 8/2017 | Golitschek Edler Von Elbwart | ............... | H04L 5/005 |
| 2018/0049055 A1 * | 2/2018 | Wiberg | ............... | H04B 7/0695 |
| 2018/0049238 A1 * | 2/2018 | Frenne | ............... | H04B 7/086 |
| 2018/0287841 A1 * | 10/2018 | Subramanian | ...... | H04L 27/2611 |
| 2018/0309526 A1 * | 10/2018 | Zhang | ............... | H04B 7/0617 |
| 2018/0323835 A1 * | 11/2018 | Wang | ............... | H04B 7/0417 |
| 2018/0324785 A1 * | 11/2018 | Nammi | ............. | H04W 72/0413 |
| 2018/0331748 A1 * | 11/2018 | Hwang | ............... | H04B 7/0486 |
| 2018/0338254 A1 * | 11/2018 | Ho | ............... | H04W 24/10 |
| 2019/0044601 A1 * | 2/2019 | Chang | ............... | H04W 36/0022 |
| 2019/0052331 A1 * | 2/2019 | Chang | ............... | H04B 7/0626 |

FOREIGN PATENT DOCUMENTS

| | | | | |
|---|---|---|---|---|
| KR | 101605326 B1 | 4/2016 | | |
| WO | 2015016489 A1 | 2/2015 | | |
| WO | WO-2017074488 A1 * | 5/2017 | ........... | H04B 7/0617 |
| WO | WO-2017086922 A1 * | 5/2017 | ............... | H04B 7/04 |
| WO | WO-2017146773 A1 * | 8/2017 | ........... | H04W 52/40 |

OTHER PUBLICATIONS

3GPP TS 36.212 V13.1.0, "3rd Generation Partnership Project; Technical Specification Group Radio Access Network; Evolved Universal Terrestrial Radio Access (E-UTRA); Multiplexing and Channel Coding (Release 13)," Mar. 2016, 129 pages.

* cited by examiner

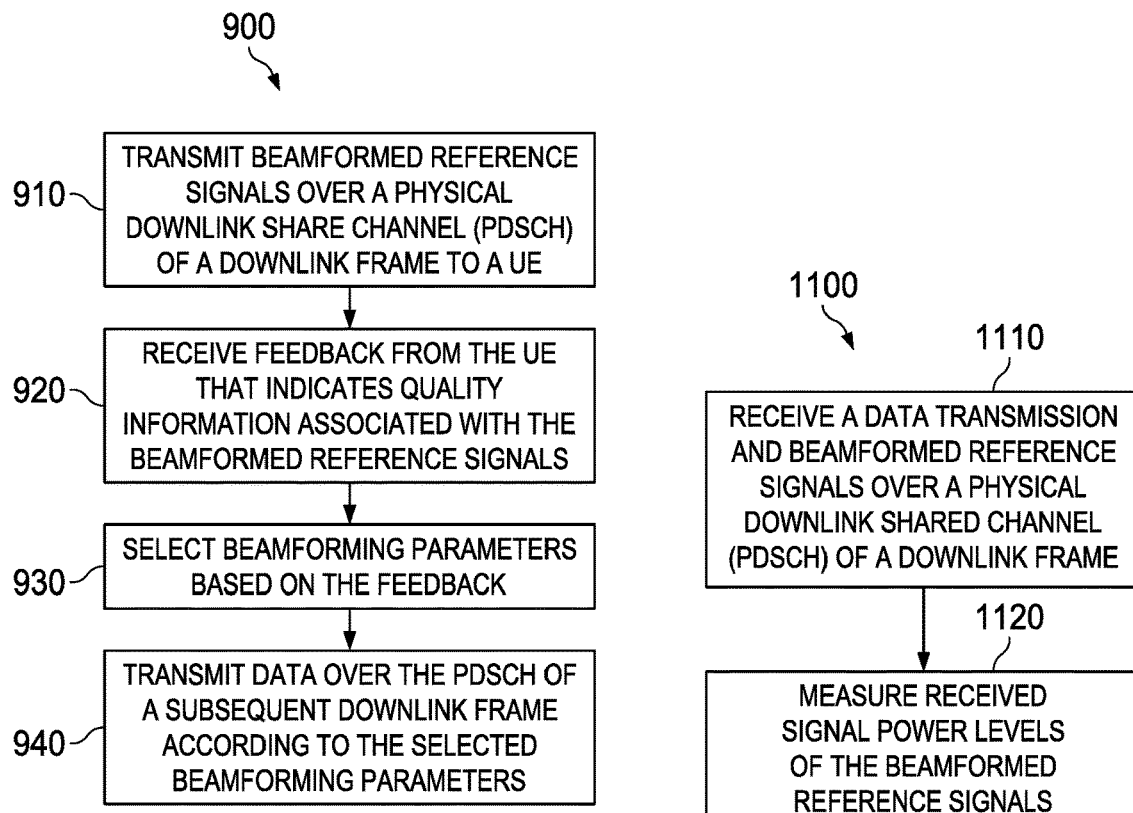
FIG. 9
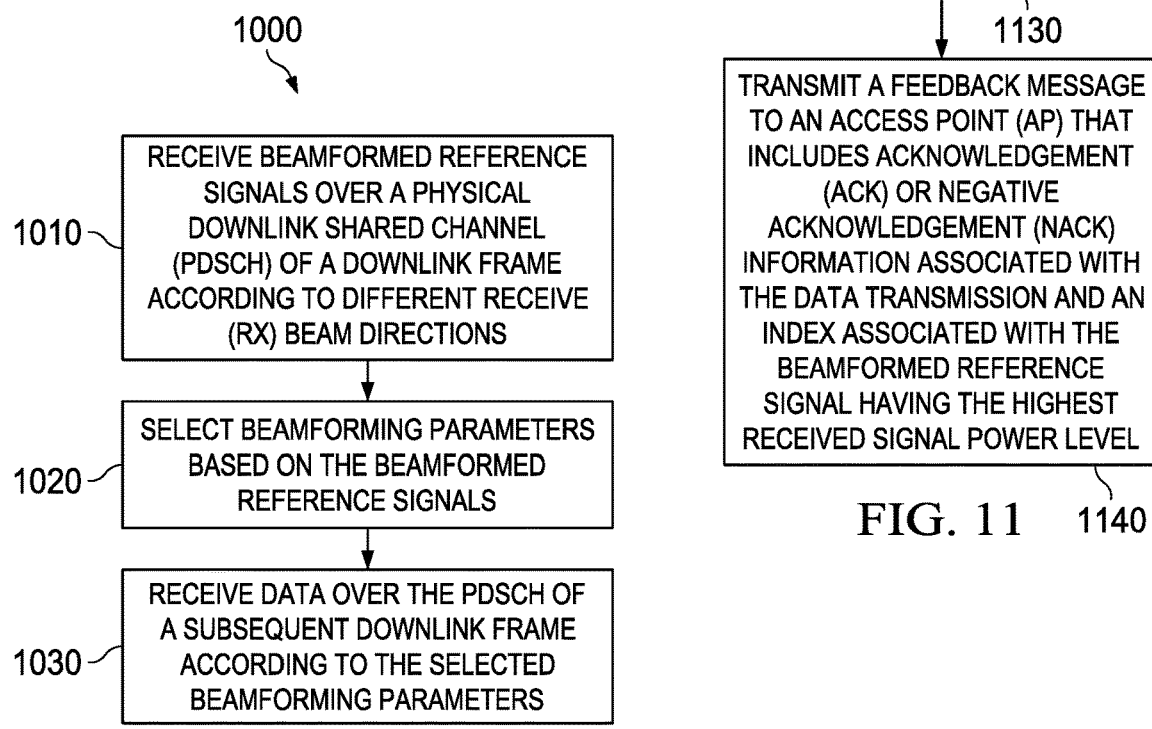
FIG. 10
FIG. 11

SYSTEMS AND METHODS FOR UE-SPECIFIC BEAM MANAGEMENT FOR HIGH FREQUENCY WIRELESS COMMUNICATION

This patent application is a continuation of PCT/CN2017/096504 filed on Aug. 8, 2017 and entitled "Systems and Methods for UE-Specific Beam Management for High Frequency Wireless Communication," which application claims the benefit to U.S. Provisional Application No. 62/372,200 filed on Aug. 8, 2016, which applications are hereby incorporated by reference herein as if reproduced in its entirety.

TECHNICAL FIELD

The present application relates generally to managing the allocation of resources in a network, and in particular embodiments, to systems and methods for UE-specific beam management for high frequency wireless communication.

BACKGROUND

Wireless signals communicated at high carrier frequencies, such as millimeter Wave (mmW) signals, tend to exhibit high free-space path loss. Beamforming techniques may be used to compensate for these attenuation characteristics and extend the range of high frequency wireless signals. In some high frequency implementations, beamforming is performed at both the transmitter and the receiver. This may require the transmitter and receiver to engage in a beam scanning operation during link establishment to evaluate different combinations of transmit (TX) beams and receive (RX) beam directions. It may also be helpful for the transmitter and receiver to perform beam scanning periodically so that the beamforming parameters can be adjusted to account for changes in the condition of the air interface.

SUMMARY OF THE INVENTION

Technical advantages are generally achieved, by embodiments of this disclosure which describe UE-specific beam management for high frequency wireless communication.

In accordance with an embodiment, a method for supporting beam-formed communication in a wireless network is provided. In this example, the method includes transmitting or receiving a subframe that includes a physical downlink shared channel (PDSCH) region to a user equipment (UE). The PDSCH region of the subframe includes a reference signal (RS) section and a data section. The RS section includes one or more of a beam-scanning subsection, a transmit (TX) beam-tracking subsection, a receive (RX) beam-tracking subsection, and a channel state information (CSI) subsection. An apparatus for performing this method is also provided. In an embodiment, a base station transmits a subframe that includes a physical downlink shared channel (PDSCH) region to a user equipment (UE). The PDSCH region of the subframe includes a reference signal (RS) section and a data section. The RS section includes one or more of a beam-scanning subsection, a transmit (TX) beam-tracking subsection, a receive (RX) beam-tracking subsection, and a channel state information (CSI) subsection. Optionally, in any of the preceding aspects, the base station may transmit a downlink control information (DCI) message that indicates which RS subsections are included in the RS section of the PDSCH region of the subframe. The DCI message may further indicate locations of the RS subsections in the RS section of the PDSCH region of the subframe. Optionally, in any of the preceding aspects, reference signals in the TX beam-tracking subsection may be transmitted using different TX analog beams and received by the UE using the same RX analog beam, reference signals in the RX beam-tracking subsection may be transmitted by the base station using the same TX analog beam and received by the UE using different RX analog beams, reference signals in the beam-scanning subsection may be transmitted by the base station using different TX analog beams and received by the UE using different RX analog beams, and/or reference signals in the CSI subsection may be transmitted over quasi-co-located (QCL) antenna ports and are used to determine TX and/or RX parameters for subsequent data transmissions.

In accordance with another embodiment, a user equipment (UE) receives a subframe that includes a physical downlink shared channel (PDSCH) region from a base station. The PDSCH region of the subframe includes a reference signal (RS) section and a data section. The RS section including one or more of a beam-scanning subsection, a transmit (TX) beam-tracking subsection, a receive (RX) beam-tracking subsection, and a channel state information (CSI) subsection. Optionally, in any of the preceding aspects, the UE may, upon receiving the subframe, update an RX beam direction based on reference signals received over the RX beam-tracking subsection of the PDSCH region of the subframe, and then use the updated RX beam direction to receive a data signal in a subsequent subframe. Optionally, in any of the preceding aspects, the UE may, upon receiving the subframe, determine a TX beam-tracking feedback information based on reference signals received over the TX beam-tracking subsection of the PDSCH region of the subframe, and transmit a signal carrying the TX beam-tracking feedback to the base station. Optionally, in any of the preceding aspects, the UE may, upon receiving the subframe, determine beam-scanning feedback information based on reference signals received over the beam-scanning subsection of the PDSCH region of the subframe, and transmit a signal carrying the beam-scanning feedback information to the base station. Optionally, in any of the preceding aspects, the UE may, upon receiving the subframe, determine CSI information based on reference signals received over the beam-scanning subsection of the PDSCH region of the subframe. In such an example, the CSI information may include at least one of a digital precoding matrix indicator (PMI) a channel quality indicator (CQI), or an antenna rank, and the UE may transmit a signal carrying the CSI information to the base station. Optionally, in any of the preceding aspects, the UE may, upon receiving the subframe, process data carried in the data section of the PDSCH region of the subframe in accordance with TX parameters carried in a downlink control information (DCI) message.

In accordance with yet another embodiment, a base station transmits beamformed reference signals over a data channel of a downlink frame to at least one user equipment (UE), receives feedback from the UE that indicates quality information associated with the beamformed reference signals, selects beamforming parameters based on the feedback, and transmits data over the data channel of a subsequent downlink frame according to the selected beamforming parameters. Optionally, in any of the preceding aspects, at least two of the beamformed reference signals may be transmitted according to different transmit (TX) beam directions than one another. Optionally, in any of the preceding aspects, the data channel of the downlink frame may further carry a downlink data transmission from the base station to the UE, and the beamformed reference signals may be UE-specific beamformed reference signals that are communicated over the same frequencies as the downlink data transmission in the downlink frame. Optionally, in any of the preceding aspects, the beamformed reference signals may be group-specific beamformed reference signals. Optionally, in any of the preceding aspects, the beamformed reference signals may include a set of beam-scanning reference signals and a set of beam-tracking reference signals, in which case the beam-tracking reference signals may be used to adjust transmit (TX) or receive (RX) beamforming parameters of a downlink data transmission communicated over the data channel, and the beam-scanning reference signals may be used to select TX beamforming parameters for performing transmissions. Optionally, in any of the preceding aspects, the beamformed reference signals include a set of beamformed channel state information (CSI) reference signals, a set of receive (RX) beam-tracking reference signals, and/or a set of transmit (TX) beam-tracking reference signals. The RX beam-tracking reference signals may be transmitted according to the same TX beam direction and may be used to evaluate different RX beam directions in the data channel. The TX beam-tracking reference signals may be transmitted according to different TX beam directions and may be used to evaluate the different TX beam directions in the data channel. Optionally, in any of the preceding aspects, the downlink frame may be one downlink frame in a sequence of downlink frames, and beamformed reference signals may be excluded from other downlink frames in the sequence of downlink frames communicated over the data channel. Optionally, in any of the preceding aspects, the base station may transmit a downlink control information (DCI) message that specifies a configuration of the beamformed reference signals. Optionally, in any of the preceding aspects, the base station may transmit a radio resource configuration (RRC) message that specifies at least one candidate beamforming configuration for the data channel, and a downlink control information (DCI) message that specifies whether the candidate beamforming configuration is present or active in the data channel of the downlink frame.

In accordance with yet another embodiment, a user equipment (UE) may transmit beamformed reference signals over a data channel of a downlink frame, select RX beamforming parameters based on the beamformed reference signals, and receive data over the data channel of a subsequent downlink frame according to the selected RX beamforming parameters. Optionally, in any of the preceding aspects, at least two of the beamformed reference signals may be received according to different receive (RX) beam directions. Optionally, in any of the preceding aspects, the beamformed reference signals may be UE-specific beamformed reference signals or group-specific beamformed reference signals.

In accordance with yet another embodiment, a user equipment (UE) receives a data transmission and beamformed reference signals over a data channel of a downlink frame, processes the beamformed reference signals, attempts to decode the data transmission, and transmits a feedback message to a base station that includes an acknowledgement (ACK) or negative acknowledgement (NACK) message indicating whether the data transmission was successfully decoded as well as an index associated with one of the beamformed reference signals having the highest received signal power level or channel state information (CSI). The beamformed reference signals may be UE-specific beamformed reference signals or group-specific beamformed reference signals.

In accordance with yet another embodiment, a base station transmits a control message indicating that a region of a data channel is persistently assigned to carry beamformed reference signals to a first user equipment (UE), and transmits a downlink control information (DCI) message to the first UE. The DCI message indicates that the region of the data channel in a downlink frame is configured for zero transmission power. The base station then transmits a signal to a second UE over the region of the data channel in the downlink frame. The second UE is different than the first UE. The region of the data channel may be persistently assigned to carry UE-specific beamformed reference signals.

An apparatus for performing each of the above-described methods is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a flowchart of an embodiment method for transmitting beamformed reference signals;

FIG. 10 illustrates a flowchart of an embodiment method for receiving beamformed reference signals;

FIG. 11 illustrates a flowchart of another embodiment method for receiving beamformed reference signals;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
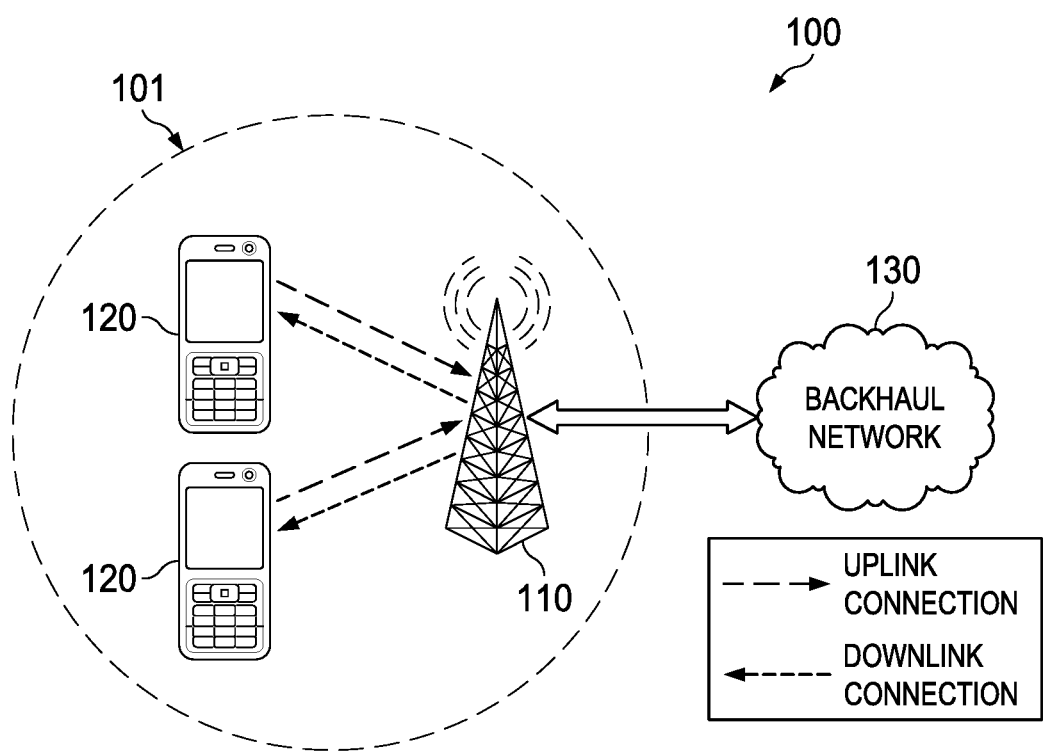
FIG. 1 illustrates a diagram of a wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As used herein, the term "beam direction" refers to a set of beamforming weights (e.g., amplitude/phase shifts for antenna elements of a phased array antenna) that are used for directional signal transmission and/or reception. It should be appreciated that radiation patterns associated with different beam-directions may be formed according to codebook-based precoding, as well as non-codebook based precoding, e.g., Eigen-based beamforming (EBB)) forming. Radiation patterns associated with different beam directions may have the same numbers of lobes, or different numbers of lobes, as well as lobes having different beam-widths.

Embodiments of this disclosure provide downlink frame structures that support beam-scanning and beam-tracking for high-frequency communications. In an embodiment, beamformed reference signals are communicated over a physical downlink shared channel (PDSCH) of a downlink frame. The beamformed reference signals may include a set of beam-scanning reference signals, a set of transmit (TX) beam-tracking reference signals, a set of receive (RX) beam-tracking reference signals, a set of CSI beamformed reference signals, or a combination thereof. Beam-scanning reference signals may be transmitted according to different TX beam directions. Received signal quality of beam-scanning reference signals may be used to select a transmit analog beam direction for uplink transmissions. TX beam-tracking reference signals may be transmitted according to different TX beam directions. The UE may feedback indices of TX beam-tracking reference signals that satisfy a certain criteria to the base station. The base station may use the indices to select an analog beam direction for downlink transmissions. RX beam-tracking reference signals may be received according to different RX beam directions. Received signal quality of RX beam-tracking reference signals may be used to select a receive analog beam direction for receiving downlink transmissions.

In some embodiments, RX beam-tracking signals are transmitted according to the same TX beam direction, and TX beam-tracking reference signals are received according to the same RX beam direction. For example, the RX beam-tracking reference signals may be transmitted according to a TX beam direction used to communicate a data transmission communicated in the PDSCH of the downlink frame, and the TX beam-tracking reference signals may be received according to the same RX beam direction used to receive the downlink data transmission. This may allow the UE, or the base station, to determine when the TX and/or RX beam directions should be modified to improve performance of an active link.

Base stations may use various forms of control signaling to configure beam forming reference signal parameters in a downlink frame. In one embodiment, a base station signals a beamforming reference signal configuration for a PDSCH in a downlink control information (DCI) message. In another embodiment, the base station signals a beamforming reference signal configuration for a PDSCH in a radio resource configuration (RRC) message. In yet another embodiment, the base stations signals one or more candidate beamforming configurations for a PDSCH in an RRC message, and then signals which (if any) of the candidate beamforming configurations are active for a given frame in a DCI message. By way of example, the RCC message may specify different candidate beamforming configurations for beam-scanning, TX beam-tracking, RX-beam-tracking, and/or CSI beamformed reference signals, and the DCI message may indicate which of the candidate beamforming configurations are active/enabled. For a given reference signal configuration, a control signal may specify a number of TX or RX beam directions that are used to transmit/receive a beam-scanned reference signals in a PDSCH region of frame, and a number of OFDM symbols for each beamformed transmission. Other information may also be specified in the control signaling, such as a location of the symbols over which the beamformed transmissions are communicated, and an indication as to which RX beamforming configuration (e.g., RX beam directions) should be used to receive the beamformed reference signals. In the case of CSI beamformed reference signals, the number of antenna ports, as well as the antenna port configuration, used for each beamformed reference signal transmission may be indicated by the control signal.

A base station may also re-configure regions of a PDSCH that are persistently scheduled for beamformed reference signal transmission to a UE, or a group of UEs, by communicating a control instruction that indicates a zero power allocation region of a PDSCH in a downlink frame. The control instruction may be communicated in a DCI or RRC message, and may prompt the UE to refrain from processing signal communicated over the region of PDSCH in the downlink frame, thereby allowing that region to be used for another purpose, such as to transmit signaling to a different UE.

In some embodiments, a PDSCH region of a subframe includes a reference signal (RS) section and a data section. The RS section may include one or more of a beam-scanning subsection, a transmit (TX) beam-tracking subsection, a receive (RX) beam-tracking subsection, and a channel state information (CSI) subsection. Reference signals in the TX beam-tracking subsection may be transmitted using different TX analog beams and received using the same RX analog beam. In this way, reference signals in the TX beam-tracking subsection may be used to update TX analog beams. For example, a UE may determine TX beam-tracking feedback information based on reference signals received over the TX beam-tracking subsection of a subframe, and transmit a signal carrying the TX beam measurement to the base station. The base station may then adjust a TX analog beam used to transmit a data signal in a subsequent subframe based on the TX beam measurement received from the UE.

Reference signals in the RX beam-tracking subsection may be transmitted using the same TX analog beam and received using different RX analog beams. In this way, reference signals in the RX beam-tracking subsection may be used to update RX analog beams. For example, a UE may update an RX beam direction based on reference signals received over the RX beam-tracking subsection of a subframe, and then use the updated RX beam direction to receive a data signal in a subsequent subframe.

Reference signals in a beam-scanning subsection of a subframe may be transmitted using different TX analog beams and received using different RX analog beams. In this way, reference signals in the beam-scanning subsection may be used to evaluate different combinations of TX and RX analog beams to use for a future directional data transmission. For example, a UE may determine beam-scanning feedback information based on reference signals received over the beam-scanning subsection of the PDSCH region of the subframe, and transmit a signal carrying the beam-scanning feedback information to the base station. The beam-scanning feedback information may indicate a signal quality parameter associated with a pair of TX and RX analog beams, or otherwise identify one or more pairs of TX/RX analog beams that provided the best spatial performance, and may be used by the base station and/or UE to select a TX and/or RX beam direction for initial data transmission.

Reference signals in the CSI subsection may be transmitted over quasi-co-located (QCL) RS antenna ports, or otherwise assumed to be transmitted over QCL RS antenna ports, and may be used for purposes of channel estimation. Two antenna ports are said to be quasi co-located if large-scale properties of a channel associated with one antenna port can be inferred from a reference signal received over the other antenna port. The large-scale properties include one or more of delay spread, Doppler spread, Doppler shift, average gain, and average delay. In one example, a UE may estimate CSI information (e.g., digital precoding matrix indicator (PMI), channel quality indicator (CQI), antenna rank, etc.) based on reference signals received over the beam-scanning subsection of a subframe. The UE may process data carried in a data section of the subframe in accordance with the CSI information, or otherwise feedback the CSI information to a base station, which may use the CSI information to adjust TX parameters (e.g., adjust a digital beam direction) and/or process uplink signals.

In some embodiments, downlink control information (DCI) messages may be used to signal various configuration parameters of the RS section, such as which RS subsections are included in an RS section of a PDSCH region of a given subframe and/or the locations/boundaries of RS subsections in the RS section of the PDSCH region of a given subframe. These and other aspects are discussed in greater detail below.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
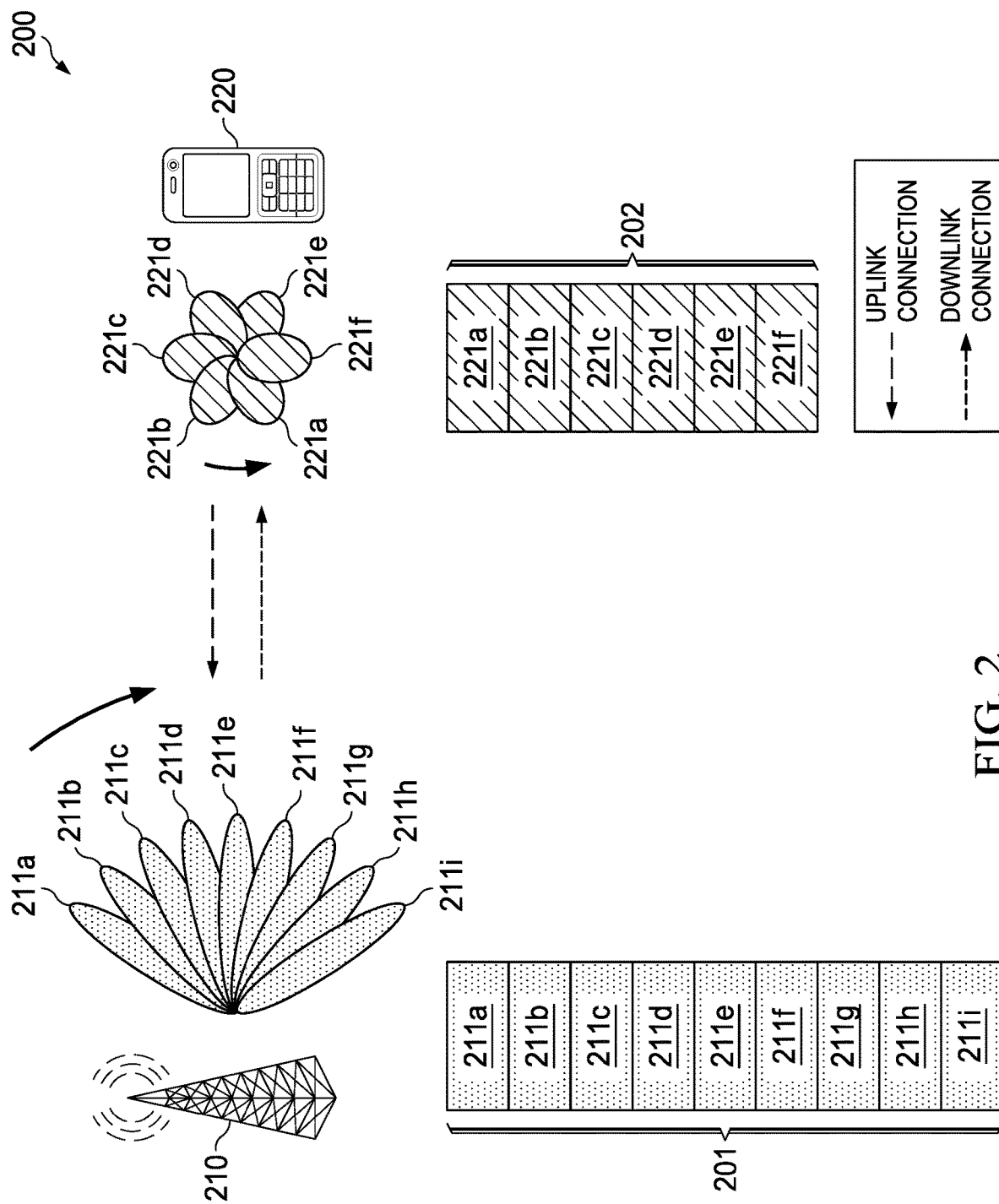
FIG. 2 illustrates a diagram of an embodiment wireless communications network for beam-scanning or beam-tracking.

FIG. 2 illustrates a wireless communications network 200 for performing beam-scanning or beam-tracking to determine beamforming parameters for a high-frequency communications session between a base station 210 and a UE 220. In particular, the base station 210 may transmit beamformed reference signals over one or more transmit (TX) beam directions 211a-211i in a set of TX beam directions 201, and the UE 220 may receive the beamformed reference signals over one or more receive (RX) beam directions 221a-221f in a set of RX beam directions 202. Although the set of TX beam directions 201 includes nine TX directions and the set of RX beam directions 202 includes six RX directions, it should be appreciated that the set of TX beam directions 201 and the set of RX beam directions 202 may include any number of beam directions. It should also be appreciated that the TX and RX designations are in the context of sending and receiving beamformed downlink reference signals, and that beam directions in the set of RX beam directions 202 and beam directions in the set of TX beam directions 201 may be used to transmit and receive uplink transmissions, respectively.

In one example, each combination of beam directions between the set of TX beam directions 201 and the set of RX beam directions 202 are evaluated. For example, the base station 210 may transmit six beamformed reference signals over each of the nine TX beam directions 211a-211i (for a total fifty-four beamformed reference signals), and the UE 220 may receive a beamformed reference signal from each the nine TX beam directions 211a-211i over each of the six RX beam directions 221a-221f. In another example, a subset of the TX beam directions 211a-211i are evaluated over a subset of the RX beam directions 221a-221f. In yet another example, all, or a subset, of the TX beam directions 211a-211i are evaluated over a single one of the RX beam directions 221a-221f. In yet another example, a single TX beam direction is evaluated over all, or a subset, of the RX beam directions 221a-221f. Other examples are also possible.

Figure 3:
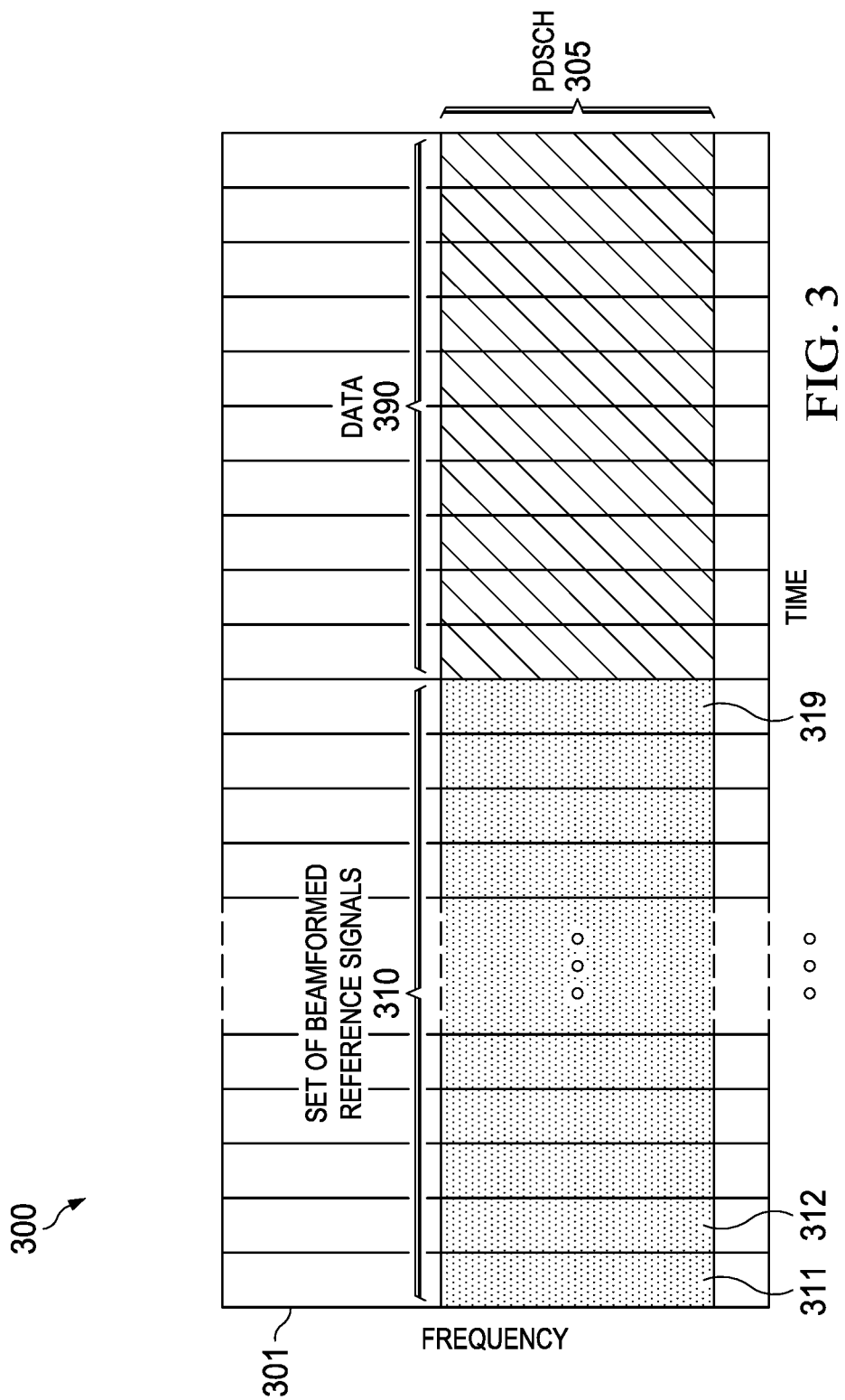
FIG. 3 illustrates a diagram of an embodiment frame format for communicating beamformed reference signals in a downlink frame.

FIG. 3 illustrates a diagram of an embodiment frame configuration 300 for a downlink frame 301. As shown, a set of beamformed reference signals 310 and a data transmission 390 are communicated over a physical downlink shared channel (PDSCH) 305 of the downlink frame 301. The set of beamformed reference signals 310 include beamformed reference signals 311-319. At least two beamformed reference signals in the set of beamformed reference signals 310 may be transmitted according to different transmit (TX) beam directions than one another. The set of beamformed reference signals 311-319 may include beam-scanning reference signals, TX beam-tracking reference signals, RX beam tracking reference signals, CSI beamformed reference signals, or a combination thereof. In one embodiment, the beamformed reference signals 311-319 are UE-specific beamformed reference signals. In such an embodiment, the beamformed reference signals 311-319 may be transmitted to the same UE as the data transmission 390. In another embodiment, the beamformed reference signals 311-319 are group-specific beamformed reference signals.

Upon reception of the downlink frame 301, a UE may process the beamformed reference signals to obtain various information about the channel. Different types of beamformed reference signals may be processed differently. In one example, a UE measures a signal quality (e.g., received signal power level, etc.) of beam-scanning reference signals, and feeds back beam indices of beam-scanning signals having a signal quality that satisfies a criteria, e.g., exceeds a threshold, etc. Beam scanning reference signals may have finer beams than beam-tracking reference signals. Beam tracking reference signals may be communicated in beam directions that are only slightly different from the beam direction used for data transmission. In another embodiment, a UE will receive different RX beam-tracking reference signals using different RX beam directions, and then adjust RX beamforming parameters that are used to receive a subsequent data transmission over the data channel. In yet another embodiment, a UE will measure a channel quality of different TX beam-tracking reference signals, and feedback quality information (e.g. an index) for beamformed reference signals that satisfy a certain threshold. In yet another example, a UE will measure a channel quality of CSI beamformed reference signals according to a CSI-RS configuration, and feedback CSI parameters to the base station. The CSI feedback parameters may include precoding matrix indicators (PMI), channel quality information (CQI), and rank indicators (RIs). A CSI-RS configuration may specify which antenna ports are to be used when receiving the CSI reference signals, as well configurations for those antenna ports. The CSI-RS configuration may be based on previous analog beam scanning feedback, and the information derived from processing the CSI beamformed reference signals may be used to select digital beamforming parameters.

In some embodiments, a UE may communicate an acknowledgement (ACK) or negative acknowledgement (NACK) message that indicates whether the downlink data transmission 390 was successfully received along with the feedback information (e.g., indices, PMI, CQI, RI, etc.) associated with the beamformed reference signals.

In some embodiments, a UE may request that a base station send beam-scanning reference signals, TX or RX beam-tracking reference signals, and/or CSI beamformed reference signals. Additionally, a UE may request that a base station increase or decrease the number of beam-scanning reference signals, TX or RX beam-tracking reference signals, and/or CSI beamformed reference signals that are transmitted in a future downlink frame. The request may be triggered by a condition of the channel (e.g., an increase or decrease in path loss, etc.), or a mobility characteristic of the device itself, e.g., the device begins moving rapidly, the device is being rapidly rotated by the user, etc.

Figure 4:
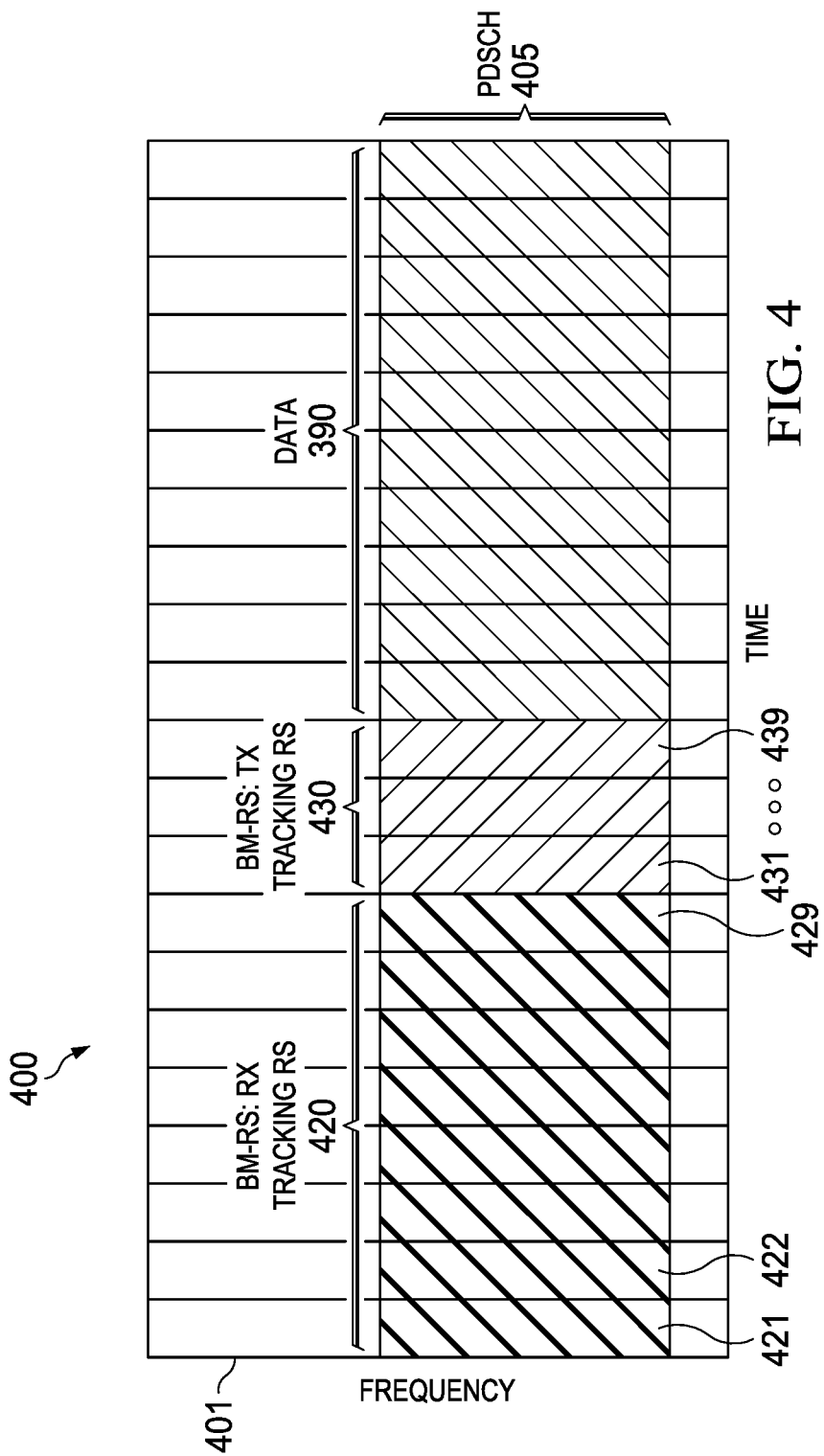
FIG. 4 illustrates a diagram of another embodiment frame format for communicating beamformed reference signals in a downlink frame.

FIG. 4 illustrates a diagram of an embodiment frame configuration 400 for a downlink frame 401. As shown, a set of receive (RX) beam-tracking reference signals 420, a set of transmit (TX) beam-tracking reference signals 430, and a data transmission 490 are communicated over a physical downlink shared channel (PDSCH) 405 of the downlink frame 401. Each of the beamformed reference signals 421-429 in the set of RX beam-tracking reference signals 420 may be transmitted in the same transmit (TX) beam direction, and may be used to evaluate various different combinations of RX beam directions for that TX beam direction. Each of the beamformed reference signals 431-439 in the set of TX beam-tracking reference signals 430 may be transmitted in a different transmit (TX) beam direction, and may be used to evaluate various different combinations of TX beam directions for a given RX beam direction. The beamformed reference signals 421-429, 431-439 may be UE-specific beamformed reference signals or group-specific beamformed reference signals.

A UE may receive at least some of the beamformed reference signals 421-429, 431-439 at different RX beam-directions, as well as attempt to decode the downlink data transmission 490. The UE may use received signal power levels for the beamformed reference signals 421-429 in the set of RX beam-tracking reference signals 420 to select an RX beam-direction in which to receive the data transmission 490 in the downlink frame 401 and/or a downlink transmission in a subsequent downlink frame. The UE may also use received signal power levels for the beamformed reference signals 421-429 to select a beam-direction over which to transmit an uplink transmission. The UE may communicate feedback to a serving base station that includes acknowledgement information indicating whether the downlink data transmission 490 was successfully received, as well as information (e.g., an index, received signal quality information, received signal power information, etc.) about one or more of the beamformed reference signals 431-439. That information may be used by the eNB to select a beam-direction over which to transmit subsequent downlink data transmissions to the UE and/or receive uplink transmissions from the UE.

Figure 5:
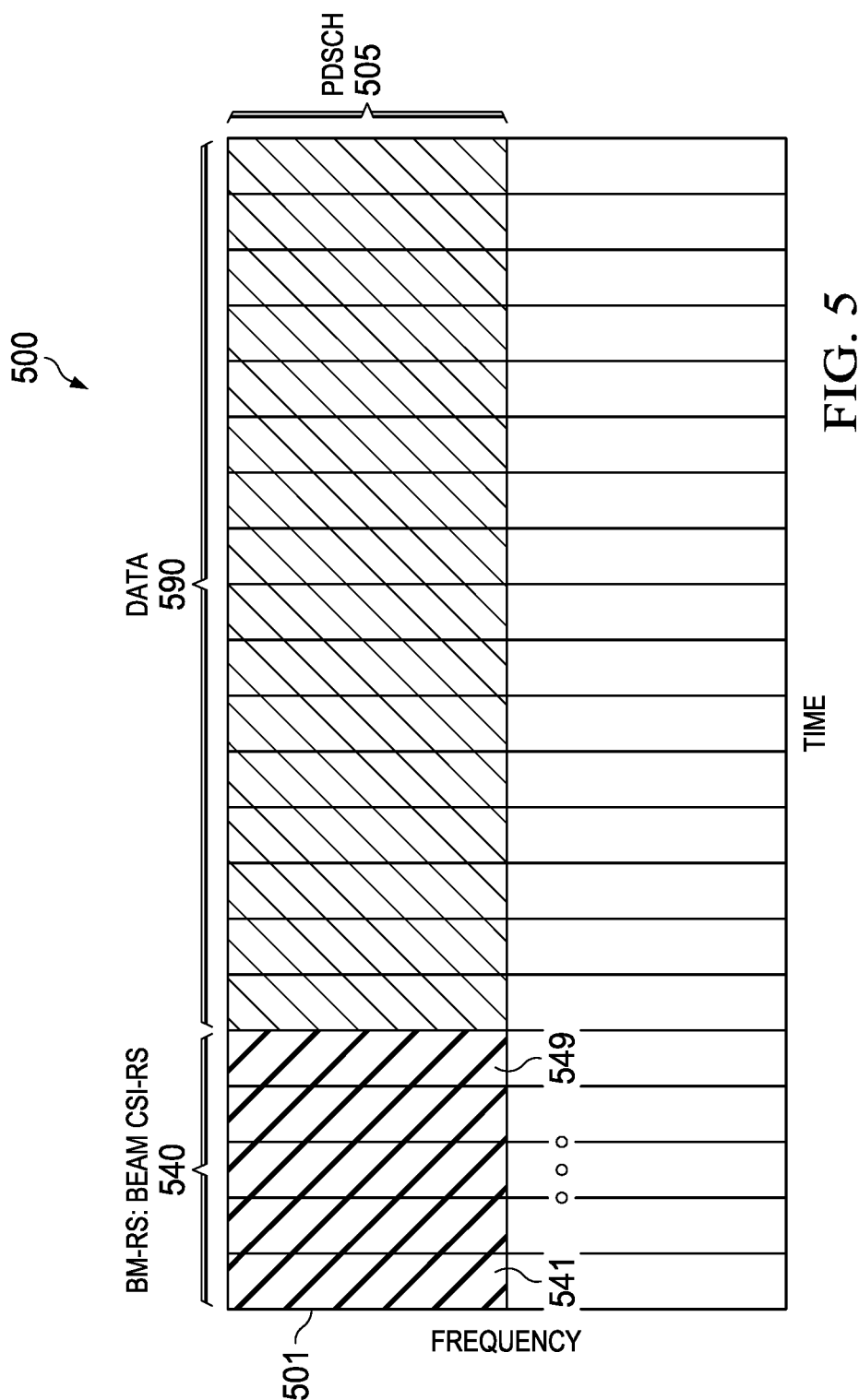
FIG. 5 illustrates a diagram of yet another embodiment frame format for communicating beamformed reference signals in a downlink frame.

FIG. 5 illustrates a diagram of an embodiment frame configuration 500 for a downlink frame 501. As shown, a set of channel state information (CSI) beam-formed reference signals 540 and a data transmission 590 are communicated over a PDSCH 505 of the downlink frame 501. CSI beamformed reference signals 541-549 in the set of CSI beamformed reference signals 540 may be transmitted using the same transmit (TX) beam direction as the data transmission 590. The CSI beamformed reference signals 541-549 may be analog beamformed reference signals.

In some embodiments, the beamformed reference signals 541-549 may also be received according to the same RX beam direction as the data transmission 590. A UE may perform channel estimation on the Beamformed reference signals 541-549, and then use the CSI to process the data transmission 590. In some embodiments, the UE will return a feedback signal to the serving base station that includes at least some of the CSI as well as an ACK or NACK message that indicates whether the data transmission 590 was successfully decoded.

Figure 6:
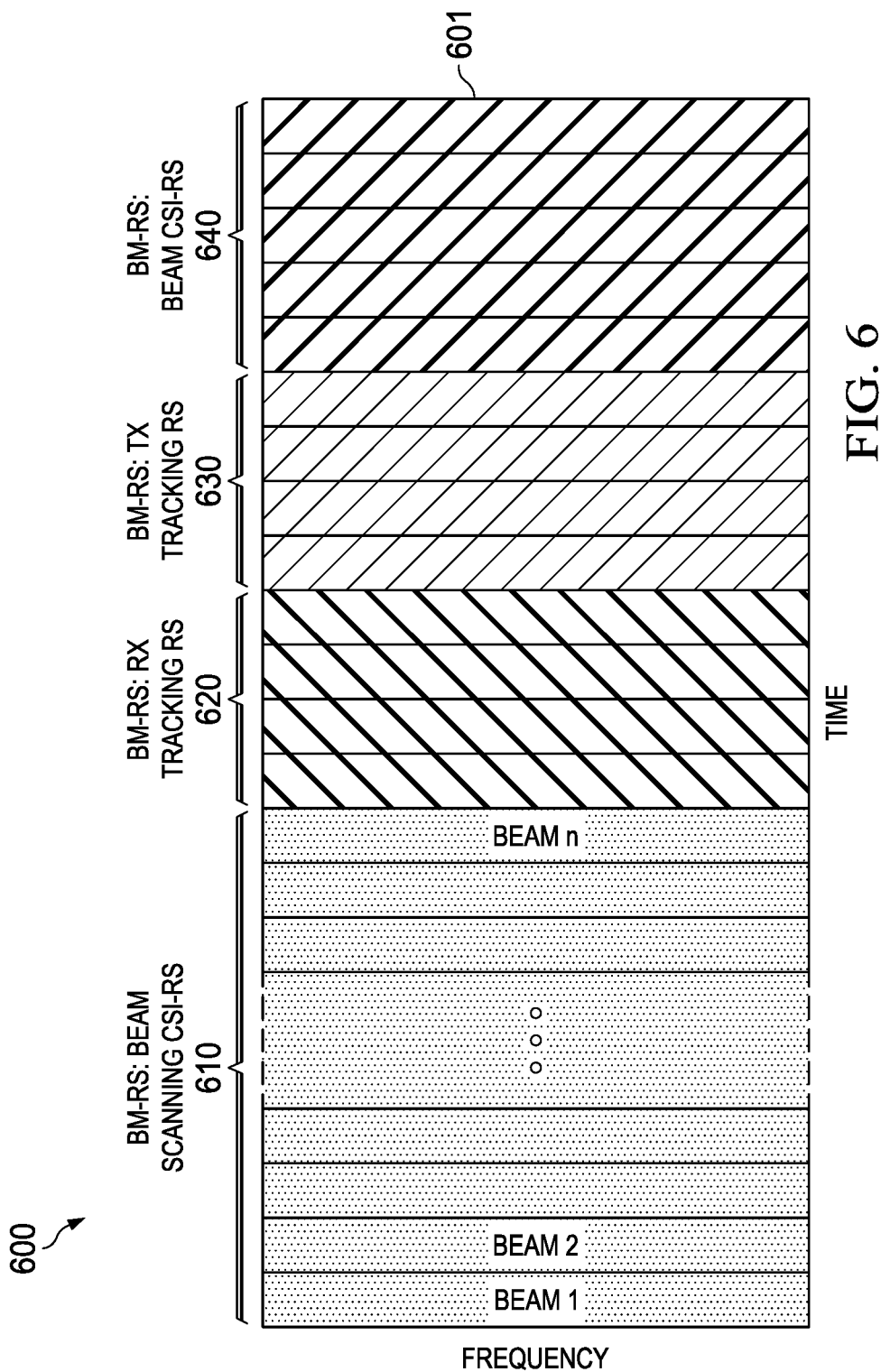
FIG. 6 illustrates a diagram of yet another embodiment frame format for communicating beamformed reference signals in a downlink frame.

FIG. 6 illustrates a diagram of an embodiment frame configuration 600 for a downlink frame 601. As shown, a set of beam-scanning reference signals 610, a set of receive (RX) beam-tracking reference signals 620, a set of transmit (TX) beam-tracking reference signals 630, and a set of channel state information (CSI) beam-formed reference signals 640 are communicated in the downlink frame 601. The set of beam-scanning reference signals 610, the set of RX beam-tracking reference signals 620, the set of TX beam-tracking reference signals 630, and the set of CSI beam-formed reference signals 640 may be similar to corresponding sets of reference signals described in reference to in FIGS. 3-5. In some embodiments, the downlink frame 601 is communicated to a UE that is not scheduled to receive a downlink data transmission, and the beamformed reference signals in the frame 601 may be used to maintain a link between the UE and a serving base station.

Figure 7:
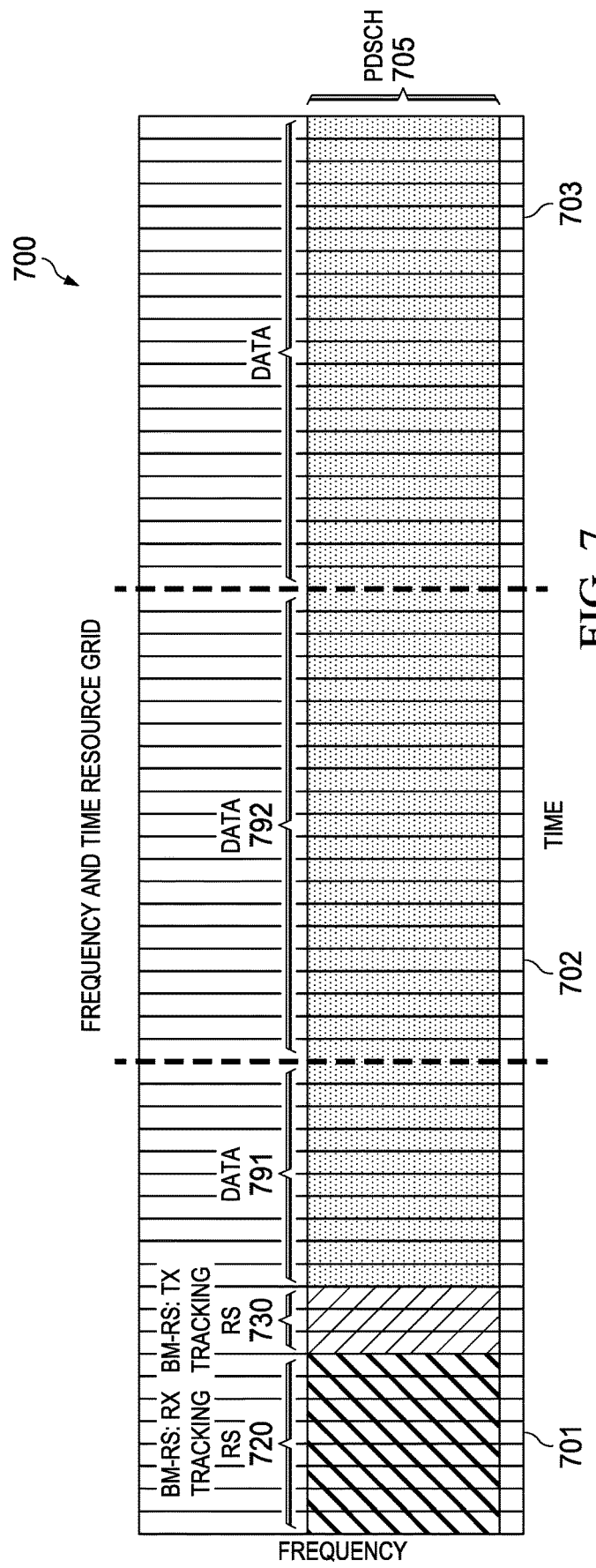
FIG. 7 illustrates a diagram of an embodiment format for communicating beamformed reference signals in a sequence of downlink frames.

FIG. 7 illustrates a diagram of an embodiment configuration 700 for a sequence of downlink frames that includes downlink frames 701, 702, 703. As shown, a set of receive (RX) beam-tracking reference signals 720, a set of transmit (TX) beam-tracking reference signals 730, and a data transmission 791 are communicated over a PDSCH 705 of the downlink frame 704 a data transmission 792 is communicated over the PDSCH 705 of the downlink frame 702, and a data transmission 793 is communicated over the PDSCH 705 of the downlink frame 703. The PDSCH 705 of downlink frames 702, 703 excludes beamformed reference signals.

The set of RX beam-tracking reference signals 720 and the set of TX beam-tracking reference signals 730 may be configured similarly to the set of RX beam-tracking reference signals 420 and the set of TX beam-tracking reference signals 430 (respectively). In some embodiments, the downlink frame 701 is communicated to a UE that has low mobility, or is otherwise experiencing a relatively stable link.

Figure 8:
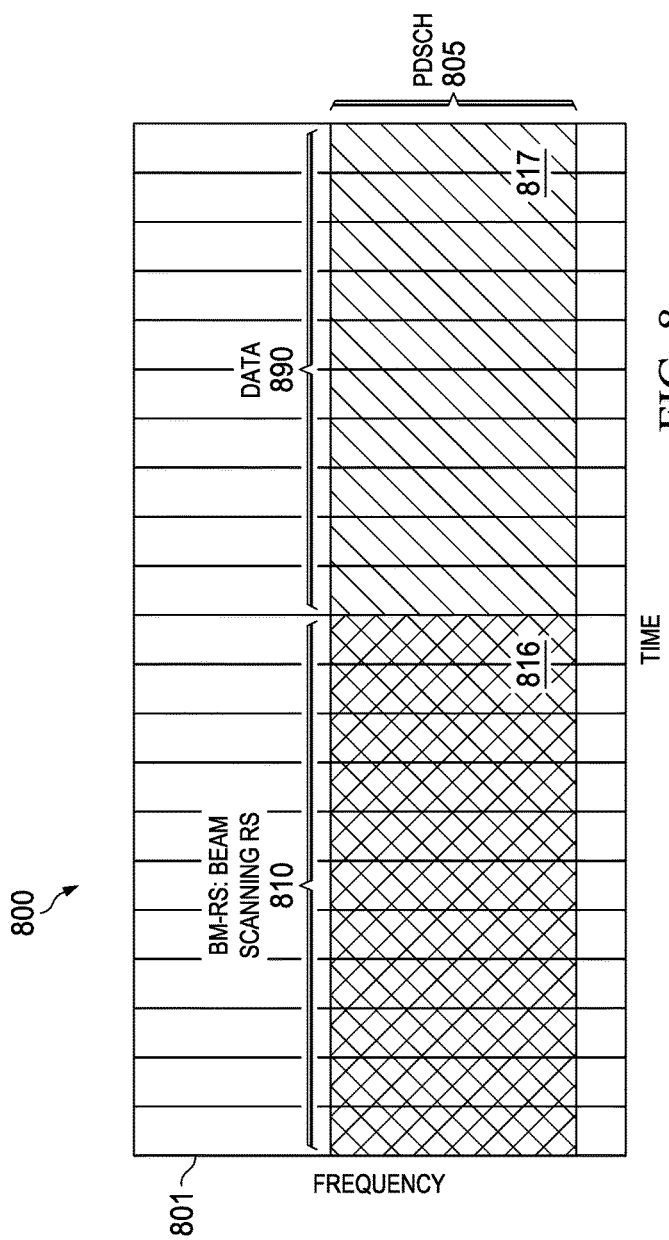
FIG. 8 illustrates a diagram of yet another embodiment frame format for communicating beamformed reference signals in a downlink frame.

FIG. 8 illustrates a diagram of an embodiment frame configuration 800 for a downlink frame 801. In this example, a PDSCH 805 in the downlink frame is assigned to a UE. A region 816 of the PDSCH 805 may be persistently assigned to carry a set of beamformed reference signals 810 to the UE, and another region 817 of the PDSCH 805 may be persistently assigned to carry data 890 to the UE. Persistent assignments may reduce overhead by allowing resources to be assigned statically, or semi-statically, such that control signaling can be sent less often. In an embodiment, a base station transmits a control message to the UE associated with the PDSCH 805 to indicate that the region 816 of the downlink frame 801, over which the set of beamformed reference signals 810 are scheduled to be received, is transmitted with zero-power. As a result, the UE does not attempt to process signaling communicated over the region 816 of the downlink frame 805, which allows the region 816 of the downlink frame 805 to be used for some other purpose, such as to communicate signaling (e.g., data, control information, reference signals, etc.) to another UE. Since the UE does not attempt to process signaling communicated over the region 816, the UE may not return feedback corresponding to the region 816 of the downlink frame 801.

FIG. 9 illustrates a method 900 for transmitting beamformed reference signals, as may be performed by a base station. At step 910, the base station transmits beamformed reference signals over a physical downlink shared channel (PDSCH) of a downlink frame to a UE. At least two of the beamformed reference signals are transmitted according to a different beam direction. At step 920, the base station receives feedback from the UE that indicates quality information associated with the beamformed reference signals. At step 930, the base station selects beamforming parameters based on the feedback. At step 940, the base station transmits data over the PDSCH of a subsequent downlink frame according to the selected beamforming parameters.

FIG. 10 illustrates a method woo for receiving beamformed reference signals, as may be performed by a UE. At step low, the UE receives beamformed reference signals over a physical downlink shared channel (PDSCH) of a downlink frame according to different receive (RX) beam directions. At step 1020, the UE selects beamforming parameters based on the beamformed reference signals received according to the different RX beam directions. At step 1030, the UE receives data over the PDSCH of a subsequent downlink frame according to the selected beamforming parameters.

FIG. 11 illustrates another method 1100 for receiving beamformed reference signals, as may be performed by a UE. At step 1110, the UE receives a data transmission and beamformed reference signals over a physical downlink shared channel (PDSCH) of a downlink frame. At step 1120, the UE measure received signal power levels of the beamformed reference signals. At step 1130, the UE attempts to decode the data transmission. At step 1140, the UE transmits a feedback message to a base station that includes acknowledgement (ACK) or negative acknowledgement (NACK) information associated with the data transmission and an index associated with the beamformed reference signal having the highest received signal power level.

Figure 12:
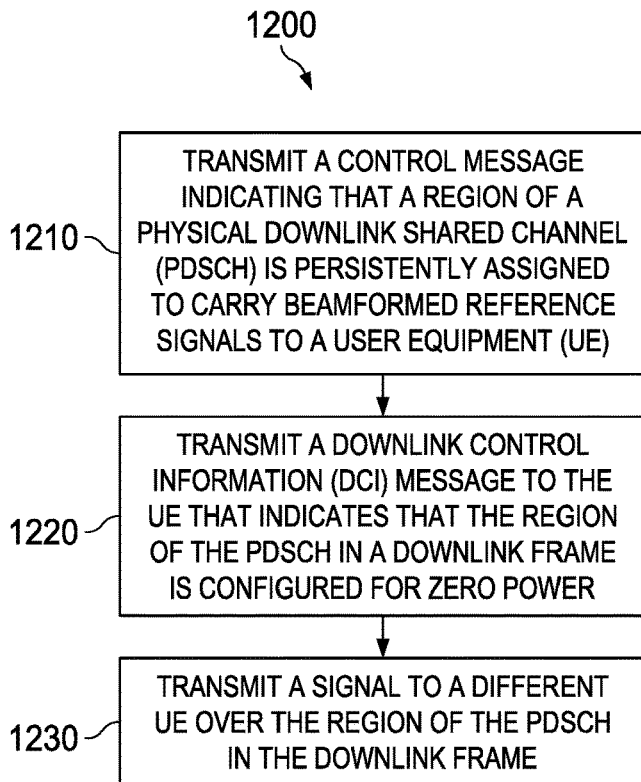
FIG. 12 illustrates a flowchart of an embodiment method for re-configuring resources that are persistently assigned to carry beamformed reference signals.

FIG. 12 illustrates a method 1200 for re-configuring a region of a downlink frame that is persistently assigned to carry beamformed reference signals to a UE, as may be performed by a base station. At step 1210, the base station transmits a control message indicating that a region of a physical downlink shared channel (PDSCH) is persistently assigned to carry beamformed reference signals to the UE. At step 1220, the base station transmits a downlink control information (DCI) message to the UE that indicates that the region of the PDSCH in a downlink frame is configured for zero power. At step 1230, the base station transmits a signal to a different UE over the region of the PDSCH in the downlink frame.

Figure 13:
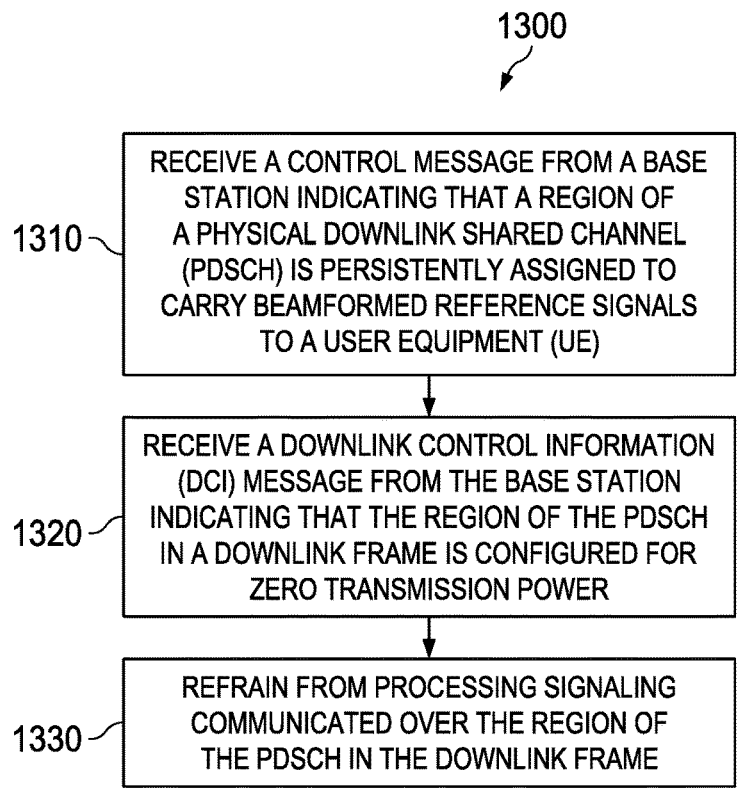
FIG. 13 illustrates a flowchart of an embodiment method for detecting beamformed reference signals over persistently assigned resources.

FIG. 13 illustrates a method 1300 for detecting beamformed reference signals over persistently assigned resources, as may be performed by a UE. At step 1310, the UE receives a control message indicating that a region of a physical downlink shared channel (PDSCH) is persistently assigned to carry beamformed reference signals to the UE. At step 1320, the UE receives a downlink control information (DCI) message that indicates that the region of the PDSCH in a downlink frame is configured for zero power. At step 1330, the UE refrains from processing signaling communicated over the region of the PDSCH in the downlink frame.

Several of the symbols scheduled for data transmission may be allocated for beam management reference signals (BM-RSs). A BM-RS may be transmitted over the same frequency resources scheduled for a data transmission. Beamformed reference signal configurations may be dynamically signaled through DCI messages or semi-statically along with data scheduling. Beamformed reference signal transmission may be performed over all, or a subset, of time-frequency resources in a PDSCH of a frame. A BM-RS configuration for a downlink frame may be signaled dynamically in a DCI message of the downlink frame. Alternatively, a BM-RS configuration may be signaled ahead of time through RRC and/or DCI messages communicated prior to the downlink frame. Feedback for a BM-RS may be communicated along with ACK/NACK signaling in a feedback message, or in a separate feedback message, e.g., a feedback message that excludes ACK/NACK signaling.

Figure 14:
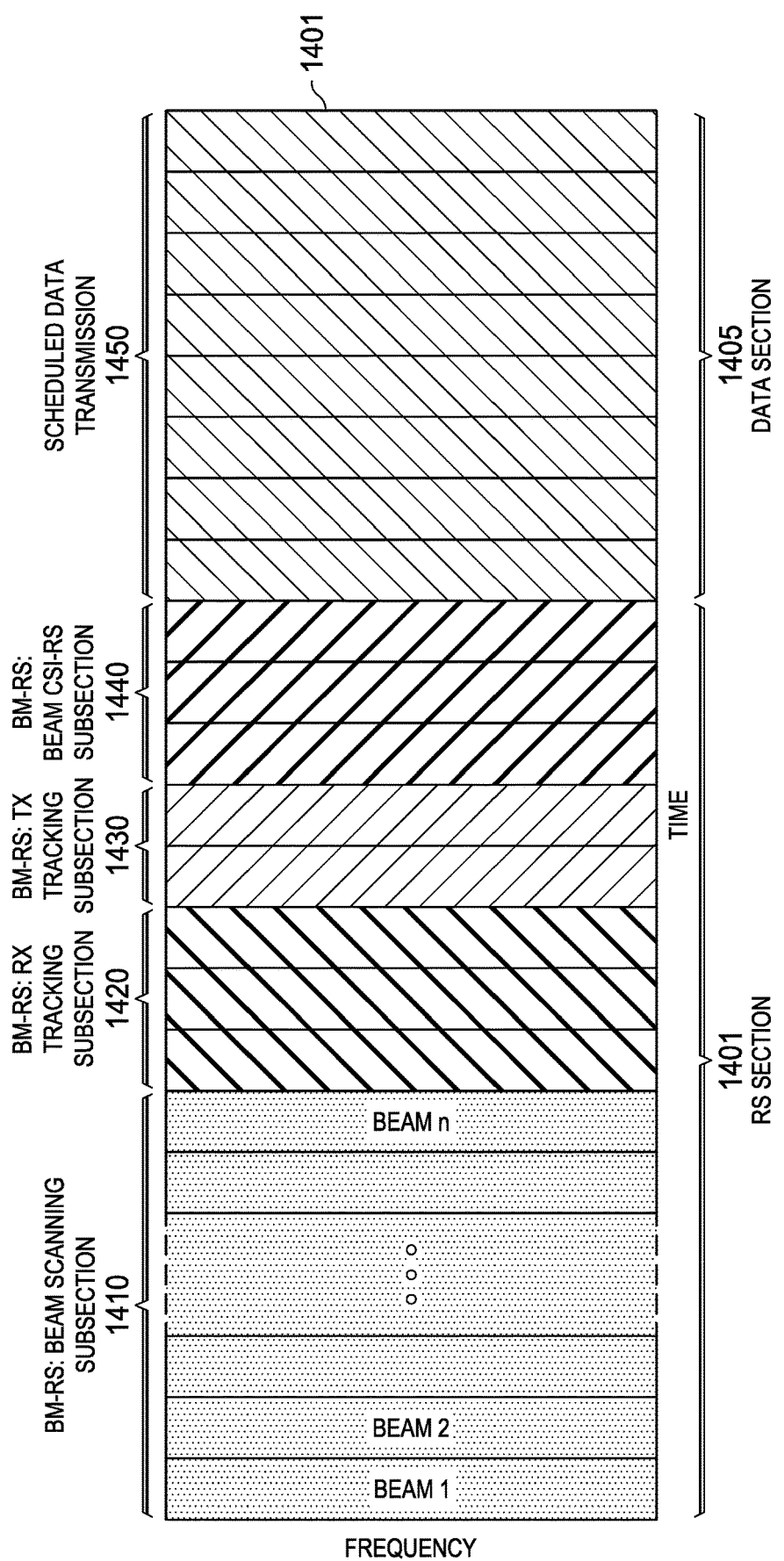
FIG. 14 illustrates a diagram of yet another embodiment frame format for communicating beamformed reference signals in a downlink frame.

FIG. 14 illustrates a diagram of an embodiment frame configuration for a PDSCH region 1400 of a downlink subframe. In this example, the PDSCH region 1400 of the downlink subframe includes a reference signal (RS) section 1401 and a data section 1405. In this example, the RS section 1401 of the PDSCH region 1400 of the downlink subframe includes a beam-scanning subsection 1410, a receive (RX) beam-tracking subsection 1420, a transmit (TX) beam-tracking subsection 1430, and a channel state information (CSI) subsection 1440, and the data section 405 of the PDSCH region 1400 of the downlink subframe includes one or more scheduled data transmissions 1450.

It should be appreciated that the beam-scanning subsection 1410, the RX beam-tracking subsection 1420, the TX beam-tracking subsection 1430, and the CSI subsection 1440 may have a different order within the RS section 1401 of the PDSCH region 1400 of the downlink subframe than that depicted in FIG. 14. It should also be appreciated that one or more of the beam-scanning subsection 1410, the RX beam-tracking subsection 1420, the TX beam-tracking subsection 1430, and the CSI subsection 1440 may be excluded from the RS section 1401 of the PDSCH region 1400 of the downlink subframe.

The base station that transmits the downlink subframe may also transmit a downlink control information (DCI) message that indicates which RS subsections are included in the RS section 1401 of the PDSCH region 1400 of the downlink subframe. In one embodiment, the DCI message also indicates locations of the RS subsections in the RS section of the PDSCH region of the subframe. By way of example, the DCI message may indicate a starting location for one or more of the RS subsections and/or a length of one or more of the RS subsections (e.g., number of symbols spanned by each RS subsection, etc.). The DCI message may also indicate RX parameters for receiving a data transmission in the data section 1405.

Reference signals in the beam-scanning subsection 1410 may be transmitted using different TX analog beams and received using different RX analog beams. In this way, reference signals in the beam-scanning subsection may be used to evaluate different combinations of TX and RX analog beams to use for a future directional data transmission/reception. For example, a UE may determine beam-scanning feedback information based on reference signals received over the beam-scanning subsection 1410, and transmit a signal carrying the beam-scanning feedback information to the base station. The beam-scanning feedback information may indicate a signal quality parameter associated with a pair of TX and RX analog beams, or otherwise identify one or more pairs of TX/RX analog beams that provided the best spatial performance, and may be used by the base station and/or UE to select a TX and/or RX beam direction for initial data transmission.

Reference signals in the TX beam-tracking subsection 1420 may be transmitted by the base station using different TX analog beams and received by the UE using the same RX analog beam. In this way, reference signals in the TX beam-tracking subsection 1420 may be used to track and/or update TX analog beams available to the base station. For example, a UE may determine TX beam-tracking feedback information based on reference signals received over the TX beam-tracking subsection 1420, and transmit a signal carrying the TX beam measurement to the base station. The base station may then adjust a TX analog beam used to transmit a data signal in a subsequent subframe based on the TX beam measurement received from the UE.

Reference signals in the RX beam-tracking subsection 1430 may be transmitted using the same TX analog beam and received using different RX analog beams. In this way, reference signals in the RX beam-tracking subsection may be used to track and/or update RX analog beams available to the UE. For example, a UE may update an RX beam direction based on reference signals received over the RX beam-tracking subsection 1430, and then use the updated RX beam direction to receive a data transmission in a subsequent subframe.

Reference signals in the CSI subsection 1440 may be transmitted over quasi-co-located (QCL) RS antenna ports, and may be used for purposes of channel estimation. In one example, a UE may estimate CSI information (e.g., digital precoding matrix indicator (PMI), channel quality indicator (CQI), antenna rank, etc.) based on reference signals received over the beam-scanning subsection of a subframe. The UE may then feedback the CSI information to a base station, which may use the CSI information to adjust TX parameters (e.g., adjust a digital beam direction) of a subsequent downlink transmission and/or process subsequent uplink transmissions of the UE.

Figure 15:
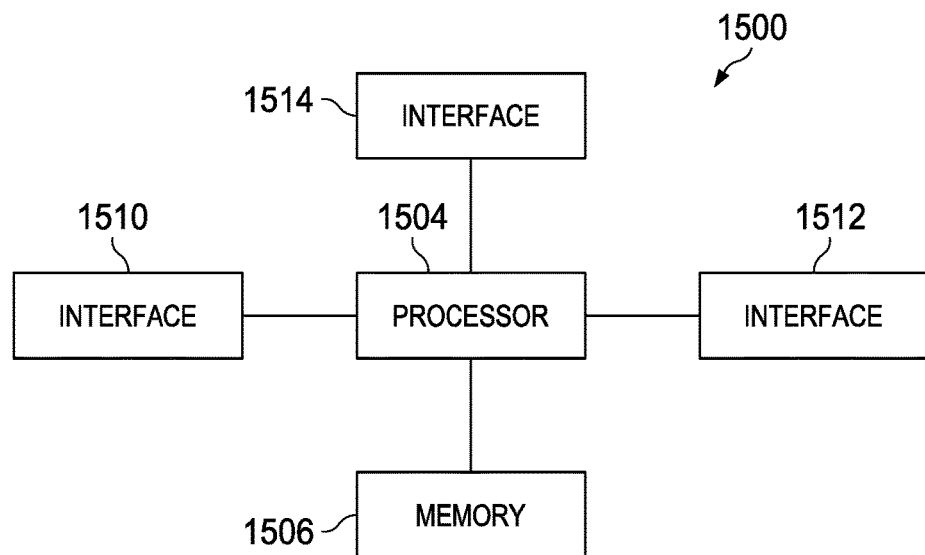
FIG. 15 illustrates a diagram of an embodiment processing system.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
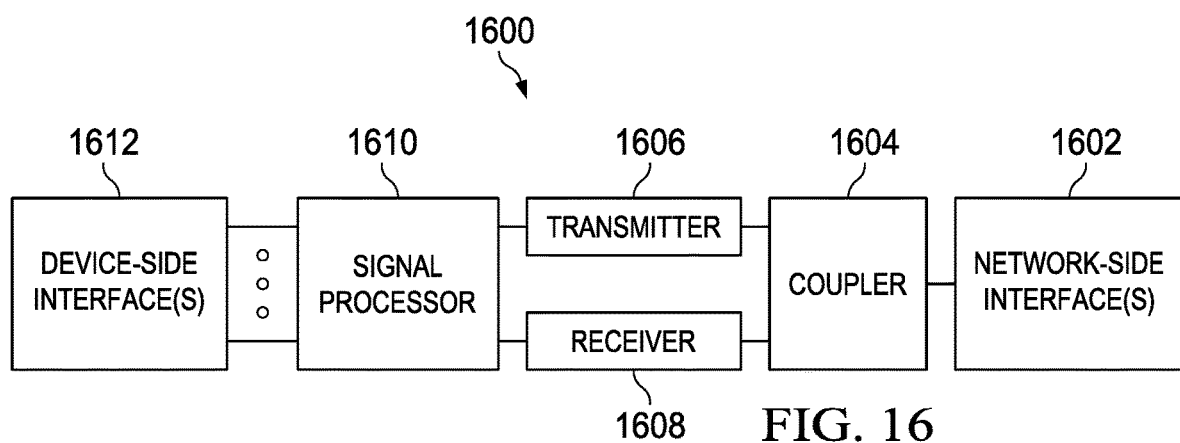
FIG. 16 illustrates a diagram of an embodiment transceiver.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, a base station transmits a subframe that includes a physical downlink shared channel (PDSCH) region to a user equipment (UE). The PDSCH region of the subframe includes a reference signal (RS) section and a data section. The RS section includes one or more of a beam-scanning subsection, a transmit (TX) beam-tracking subsection, a receive (RX) beam-tracking subsection, and a channel state information (CSI) subsection. Optionally, in any of the preceding aspects, the base station may transmit a downlink control information (DCI) message that indicates which RS subsections are included in the RS section of the PDSCH region of the subframe. The DCI message may further indicate locations of the RS subsections in the RS section of the PDSCH region of the subframe. Optionally, in any of the preceding aspects, reference signals in the TX beam-tracking subsection may be transmitted using different TX analog beams and received by the UE using the same RX analog beam, reference signals in the RX beam-tracking subsection may be transmitted by the base station using the same TX analog beam and received by the UE using different RX analog beams, reference signals in the beam-scanning subsection may be transmitted by the base station using different TX analog beams and received by the UE using different RX analog beams, and/or reference signals in the CSI subsection may be transmitted over quasi-co-located (QCL) antenna ports and are used to determine TX and/or RX parameters for subsequent data transmissions.

In another embodiment, a user equipment (UE) receives a subframe that includes a physical downlink shared channel (PDSCH) region from a base station. The PDSCH region of the subframe includes a reference signal (RS) section and a data section. The RS section including one or more of a beam-scanning subsection, a transmit (TX) beam-tracking subsection, a receive (RX) beam-tracking subsection, and a channel state information (CSI) subsection. Optionally, in any of the preceding aspects, the UE may, upon receiving the subframe, update an RX beam direction based on reference signals received over the RX beam-tracking subsection of the PDSCH region of the subframe, and then use the updated RX beam direction to receive a data signal in a subsequent subframe. Optionally, in any of the preceding aspects, the UE may, upon receiving the subframe, determine a TX beam-tracking feedback information based on reference signals received over the TX beam-tracking subsection of the PDSCH region of the subframe, and transmit a signal carrying the TX beam-tracking feedback to the base station. Optionally, in any of the preceding aspects, the UE may, upon receiving the subframe, determine beam-scanning feedback information based on reference signals received over the beam-scanning subsection of the PDSCH region of the subframe, and transmit a signal carrying the beam-scanning feedback information to the base station. Optionally, in any of the preceding aspects, the UE may, upon receiving the subframe, determine CSI information based on reference signals received over the beam-scanning subsection of the PDSCH region of the subframe. In such an example, the CSI information may include at least one of a digital precoding matrix indicator (PMI) a channel quality indicator (CQI), or an antenna rank, and the UE may transmit a signal carrying the CSI information to the base station. Optionally, in any of the preceding aspects, the UE may, upon receiving the subframe, process data carried in the data section of the PDSCH region of the subframe in accordance with TX parameters carried in a downlink control information (DCI) message.

In yet another embodiment, a base station transmits beamformed reference signals over a data channel of a downlink frame to at least one user equipment (UE), receives feedback from the UE that indicates quality information associated with the beamformed reference signals, selects beamforming parameters based on the feedback, and transmits data over the data channel of a subsequent downlink frame according to the selected beamforming parameters. Optionally, in any of the preceding aspects, at least two of the beamformed reference signals may be transmitted according to different transmit (TX) beam directions than one another. Optionally, in any of the preceding aspects, the data channel of the downlink frame may further carry a downlink data transmission from the base station to the UE, and the beamformed reference signals may be UE-specific beamformed reference signals that are communicated over the same frequencies as the downlink data transmission in the downlink frame. Optionally, in any of the preceding aspects, the beamformed reference signals may be group-specific beamformed reference signals. Optionally, in any of the preceding aspects, the beamformed reference signals may include a set of beam-scanning reference signals and a set of beam-tracking reference signals, in which case the beam-tracking reference signals may be used to adjust transmit (TX) or receive (RX) beamforming parameters of a downlink data transmission communicated over the data channel, and the beam-scanning reference signals may be used to select TX beamforming parameters for performing transmissions. Optionally, in any of the preceding aspects, the beamformed reference signals include a set of beamformed channel state information (CSI) reference signals, a set of receive (RX) beam-tracking reference signals, and/or a set of transmit (TX) beam-tracking reference signals. The RX beam-tracking reference signals may be transmitted according to the same TX beam direction and may be used to evaluate different RX beam directions in the data channel. The TX beam-tracking reference signals may be transmitted according to different TX beam directions and may be used to evaluate the different TX beam directions in the data channel. Optionally, in any of the preceding aspects, the downlink frame may be one downlink frame in a sequence of downlink frames, and beamformed reference signals may be excluded from other downlink frames in the sequence of downlink frames communicated over the data channel. Optionally, in any of the preceding aspects, the base station may transmit a downlink control information (DCI) message that specifies a configuration of the beamformed reference signals. Optionally, in any of the preceding aspects, the base station may transmit a radio resource configuration (RRC) message that specifies at least one candidate beamforming configuration for the data channel, and a downlink control information (DCI) message that specifies whether the candidate beamforming configuration is present or active in the data channel of the downlink frame.

In yet another embodiment, a user equipment (UE) may transmit beamformed reference signals over a data channel of a downlink frame, select RX beamforming parameters based on the beamformed reference signals, and receive data over the data channel of a subsequent downlink frame according to the selected RX beamforming parameters. Optionally, in any of the preceding aspects, at least two of the beamformed reference signals may be received according to different receive (RX) beam directions. Optionally, in any of the preceding aspects, the beamformed reference signals may be UE-specific beamformed reference signals or group-specific beamformed reference signals.

In yet another embodiment, a user equipment (UE) receives a data transmission and beamformed reference signals over a data channel of a downlink frame, processes the beamformed reference signals, attempts to decode the data transmission, and transmits a feedback message to a base station that includes an acknowledgement (ACK) or negative acknowledgement (NACK) message indicating whether the data transmission was successfully decoded as well as an index associated with one of the beamformed reference signals having the highest received signal power level or channel state information (CSI). The beamformed reference signals may be UE-specific beamformed reference signals or group-specific beamformed reference signals.

In yet another embodiment, a base station transmits a control message indicating that a region of a data channel is persistently assigned to carry beamformed reference signals to a first user equipment (UE), and transmits a downlink control information (DCI) message to the first UE. The DCI message indicates that the region of the data channel in a downlink frame is configured for zero transmission power. The base station then transmits a signal to a second UE over the region of the data channel in the downlink frame. The second UE is different than the first UE. The region of the data channel may be persistently assigned to carry UE-specific beamformed reference signals.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure

What is claimed is:

1. A method comprising:
transmitting, by a base station, a subframe that includes a physical downlink shared channel (PDSCH) region to a user equipment (UE), the PDSCH region of the subframe including a reference signal (RS) section and a data section, the RS section including beamformed reference signals of one or more of a beam-scanning subsection, a transmit (TX) beam-tracking subsection, a receive (RX) beam-tracking subsection, or a channel state information (CSI) subsection;
transmitting, by the base station, a control message to the UE, the control message persistently assigning a corresponding RS section in subsequent subframes to carry beamformed reference signals of the UE; and
receiving, by the base station, feedback quality information corresponding to the beamformed reference signals.

2. The method of claim 1, further comprising:
transmitting a downlink control information (DCI) message that indicates which RS subsections are included in the RS section of the PDSCH region of the subframe.

3. The method of claim 2, wherein the DCI message further indicates locations of the RS subsections in the RS section of the PDSCH region of the subframe.

4. The method of claim 1, wherein the RS section of the PDSCH region of the subframe includes the TX beam-tracking subsection, and wherein reference signals in the TX beam-tracking subsection are transmitted by the base station using different TX analog beams and received by the UE using the same RX analog beam.

5. The method of claim 1, wherein the RS section of the PDSCH region of the subframe includes the RX beam-tracking subsection, and wherein reference signals in the RX beam-tracking subsection are transmitted by the base station using the same TX analog beam and received by the UE using different RX analog beams.

6. The method of claim 1, wherein the RS section of the PDSCH region of the subframe includes the beam-scanning subsection, and wherein reference signals in the beam-scanning subsection are both transmitted by the base station using different TX analog beams and received by the UE using different RX analog beams.

7. The method of claim 1, wherein the RS section of the PDSCH region of the subframe includes the CSI subsection, and wherein reference signals in the CSI subsection are transmitted over quasi-co-located (QCL) antenna ports and are used to determine TX and/or RX parameters for subsequent data transmissions.

8. A base station comprising:
a processor; and
a non-transitory computer readable storage medium storing programming for execution by the processor, the programming including instructions to:
transmit a subframe that includes a physical downlink shared channel (PDSCH) region to a user equipment (UE), the PDSCH region of the subframe including a reference signal (RS) section and a data section, the RS section including beamformed reference signals of one or more of a beam-scanning subsection, a transmit (TX) beam-tracking subsection, a receive (RX) beam-tracking subsection, or a channel state information (CSI) subsection;
transmit a control message to the UE, the control message persistently assigning a corresponding RS section in subsequent subframes to carry beamformed reference signals of the UE; and receive feedback quality information corresponding to the beamformed reference signals.

9. A method comprising:
receiving, by a user equipment (UE), a subframe that includes a physical downlink shared channel (PDSCH) region from a base station, the PDSCH region of the subframe including a reference signal (RS) section and a data section, the RS section including beamformed reference signals of one or more of a beam-scanning subsection, a transmit (TX) beam-tracking subsection, a receive (RX) beam-tracking subsection, or a channel state information (CSI) subsection;
receiving, by the UE, a control message from the base station, the control message persistently assigning a corresponding RS section in subsequent subframes to carry beamformed reference signals; and
transmitting, by the UE, feedback quality information corresponding to the beamformed reference signals.

10. The method of claim 9, further comprising:
updating an RX beam direction based on reference signals received over the RX beam-tracking subsection of the PDSCH region of the subframe; and
using the updated RX beam direction to receive a data signal in a subsequent subframe.

11. The method of claim 9, further comprising:
determining a TX beam-tracking feedback information based on reference signals received over the TX beam-tracking subsection of the PDSCH region of the subframe; and
transmitting a signal carrying the TX beam-tracking feedback to the base station.

12. The method of claim 9, further comprising:
determining beam-scanning feedback information based on reference signals received over the beam-scanning subsection of the PDSCH region of the subframe; and
transmitting a signal carrying the beam-scanning feedback information to the base station.

13. The method of claim 9, further comprising:
determining CSI information based on reference signals received over the beam-scanning subsection of the PDSCH region of the subframe.

14. The method of claim 13, wherein the CSI information includes at least one of a digital precoding matrix indicator (PMI), a channel quality indicator (CQI), or an antenna rank.

15. The method of claim 13, further comprising:
transmitting a signal carrying the CSI information to the base station.

16. The method of claim 9, further comprising:
processing data carried in the data section of the PDSCH region of the subframe in accordance with TX parameters carried in a downlink control information (DCI) message.

17. A method comprising:
transmitting, by a base station, beamformed reference signals over a data channel of a downlink frame to at least one user equipment (UE);
transmitting, by the base station, a control message to the UE, the control message persistently assigning a corresponding reference signal section of subsequent downlink frames to carry beamformed reference signals;
receiving feedback from the UE, the feedback indicating quality information associated with the beamformed reference signals;
selecting beamforming parameters based on the feedback; and
transmitting data over the data channel of a subsequent downlink frame according to the selected beamforming parameters.

18. The method of claim 17, wherein at least two of the beamformed reference signals are transmitted according to different transmit (TX) beam directions than one another.

19. The method of claim 18, wherein the beamformed reference signals are UE-specific beamformed reference signals.

20. The method of claim 19, wherein the data channel of the downlink frame further carries a downlink data transmission from the base station to the UE, wherein the UE-specific beamformed reference signals are communicated over the same frequencies as the downlink data transmission in the downlink frame.

21. The method of claim 17, wherein the beamformed reference signals are group-specific beamformed reference signals.

22. The method of claim 17, wherein the beamformed reference signals include beam-scanning reference signals and beam-tracking reference signals, wherein the beam-tracking reference signals are used to adjust transmit (TX) or receive (RX) beamforming parameters of a downlink data transmission communicated over the data channel, and wherein the beam-scanning reference signals are used to select TX beamforming parameters for performing transmissions.

23. The method of claim 17, wherein the beamformed reference signals include a set of beamformed channel state information (CSI) reference signals.

24. The method of claim 17, wherein the beamformed reference signals include a set of receive (RX) beam-tracking reference signals and a set of transmit (TX) beam-tracking reference signals.

25. The method of claim 24, wherein the RX beam-tracking reference signals are transmitted according to the same TX beam direction and are used to evaluate different RX beam directions in the data channel.

26. The method of claim 24, wherein the TX beam-tracking reference signals are transmitted according to different TX beam directions and are used to evaluate the different TX beam directions in the data channel.

27. The method of claim 17, wherein the downlink frame is one downlink frame in a sequence of downlink frames communicated over the data channel, and wherein beamformed reference signals are excluded from other downlink frames in the sequence of downlink frames communicated over the data channel.

28. The method of claim 17, further comprising:
transmitting a downlink control information (DCI) message that specifies a configuration of the beamformed reference signals.

29. The method of claim 17, further comprising:
transmitting a radio resource configuration (RRC) message that specifies at least one candidate beamforming configuration for the data channel; and
transmitting a downlink control information (DCI) message that specifies whether the candidate beamforming configuration is present or active in the data channel of the downlink frame.

30. A method comprising:
transmitting, by a first communication node, a transmission interval that includes a shared data channel region to a second communication node, the shared data channel region of the transmission interval including a reference signal (RS) section and a data section;

transmitting, by the first communication node, a control message to the second communication node, the control message persistently assigning a corresponding RS section in subsequent transmission interval to carry reference signals of the second communication node; and receiving, by the first communication node, feedback quality information corresponding to the reference signals.

31. The method of claim 30, where the RS section includes reference signals of a scanning subsection, a transmit (TX) tracking subsection, a receive (RX) tracking subsection, or a channel state information (CSI) subsection.

32. The method of claim 30, further comprising:
transmitting a control information message that indicates which RS subsections are included in the RS section of the shared data channel region of the transmission interval.

33. The method of claim 32, wherein the control information message further indicates locations of the RS subsections in the RS section of the shared data channel region of the transmission interval.

34. The method of claim 30, wherein the RS section of the shared data channel region of the transmission interval includes a transmit (TX) tracking subsection, and wherein reference signals in the TX tracking subsection are transmitted by the first communication node using different TX beams and received by the second communication node using an RX beam.

35. The method of claim 30, wherein the RS section of the shared data channel region of the transmission interval includes an receive (RX) tracking subsection, and wherein reference signals in the RX tracking subsection are transmitted by the first communication node using a TX beam and received by the second communication node using different RX beams.

36. The method of claim 30, wherein the RS section of the shared data channel region of the transmission interval includes a scanning subsection, and wherein reference signals in the scanning subsection are both transmitted by the first communication node using different TX beams and received by the second communication node using different RX beams.

37. The method of claim 30, wherein the RS section of the shared data channel region of the transmission interval includes a channel state information (CSI) subsection, and wherein reference signals in the CSI subsection are transmitted over quasi-co-located (QCL) antenna ports and are used to determine TX and/or RX parameters for subsequent data transmissions.

* * * * *